United States Patent [19]

Mayer

[11] Patent Number: 5,774,534
[45] Date of Patent: Jun. 30, 1998

[54] CONTEXT-BASED TRANSACTIONS USING BROADCAST ADVERTISING

[75] Inventor: Daniel J. Mayer, Warren, N.J.

[73] Assignee: AT&T Corp, Middletown, N.J.

[21] Appl. No.: 877,894

[22] Filed: Jun. 18, 1997

Related U.S. Application Data

[63] Continuation of Ser. No. 364,563, Dec. 27, 1994, abandoned.

[51] Int. Cl.$^6$ .................. H04M 15/00; H04M 15/06; H04M 3/42; H04M 7/00
[52] U.S. Cl. ................. 379/142; 379/112; 379/113; 379/128; 379/133; 379/209; 379/219
[58] Field of Search .................................. 379/111, 112, 379/113, 114, 115, 118, 120, 127, 128, 130, 131, 133, 142, 207, 216, 219; 348/1, 2, 6, 12, 13

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/112 |
| 4,757,267 | 7/1988 | Riskin | 379/113 |
| 4,954,958 | 9/1990 | Savage et al. | 379/112 |
| 4,989,234 | 1/1991 | Schakowsky | 379/142 |
| 5,095,505 | 3/1992 | Finucane | 379/207 |
| 5,136,636 | 8/1992 | Wegrzynowicz | 379/127 |
| 5,164,983 | 11/1992 | Brown et al. | 379/113 |
| 5,191,410 | 3/1993 | McCalley | 348/13 |
| 5,272,749 | 12/1993 | Masek | 379/216 |
| 5,473,673 | 12/1995 | Van Wijk | 348/1 |

OTHER PUBLICATIONS

G. A. Raack, et al., "Customer Control of Network Sevices", *IEEE Communications*, vol. 22, No. 10, Oct. 1984.

*Primary Examiner*—Curtis Kuntz
*Assistant Examiner*—Vijay Shankar

[57] ABSTRACT

A broadcast network, which may have multiple affiliated television stations each broadcasting in different geographic areas, is provided with one or more easy-to-use telephone numbers. The broadcast network, in turn, assigns one or more the these numbers to its affiliated television stations, each of which allows advertisers to prominently display one of its broadcast network's telephone numbers in direct-response television advertisements broadcast by the affiliated stations in their respective geographic areas. Different advertisements broadcast on different television stations affiliated with that broadcast network may then display that same number, regardless of the geographic area in which the broadcast is received, and the time at which the advertisement is displayed. When a particular advertisement sponsored by a particular advertiser is displayed on a TV program, viewer/listeners can dial the broadcast network's telephone number in response to the advertising, in order to initiate a transaction. The call is routed based upon its "context", to a specific terminating telephone number for a transaction processor serving the advertiser associated with the advertisement. "Context" based processing is accomplished by using a call-routing database to uniquely associate each incoming call placed to the broadcast network telephone number with an advertiser's specific terminating telephone number, illustratively based upon the time period that the call is made, and the viewer/listener location where the call was originated, both of which together determine the particular advertisement to which the caller was responding. Ambiguities arising from (a) overlap of the geographic areas in which affiliated stations broadcast or (b) short time intervals between broadcast of different ads, are resolved by querying a caller using a voice response system.

49 Claims, 8 Drawing Sheets

FIG. 2

| | ORIGINATING NUMBER NPA[NXX] 220 | TIME PERIOD 221 | NETWORK AFFILIATE 222 | TERMINATING TELEPHONE NUMBER 223 | PRODUCT 224 | VOICE PROMPT 225 | ROUTE TO NSC 156 AND IDENTIFIER 226 |
|---|---|---|---|---|---|---|---|
| 201 | 212,201,908 | 6:02–10:02 | NY/CH.7 | 301-555-1234 | A | NO | |
| 202 | 212,201,908 | 10:03–10:31 | NY/CH.7 | 405-555-4321 | B | NO | |
| 203 | 404 | 10:03–10:18 | ATL/CH.3 | 301-555-1234 | A | YES | RRR-SSS-TTTT (A–C) |
| 204 | 404 | 10:19–10:34 | ATL/CH.3 | 908-555-1111 | C | YES | RRR-SSS-TTTT (A–C) |
| 205 | 201,212 908[208-499] | 10:32–11:40 | NY/CH.6 | 212-555-2222 | D | NO | |
| 206 | 215 | 10:32–11:40 | PHIL/CH.9 | 212-555-3333 | E | NO | |
| 207 | 908[500-999] | 10:32–11:40 | NY/CH.6 | 212-555-2222 | D | YES | RRR-SSS-TTTT (D–E) |
| 208 | 908[500-999] | 10:32–11:40 | PHIL/CH.9 | 212-555-3333 | E | YES | RRR-SSS-TTTT (D–E) |
| 209 | 404 | 6:02–10:02 | ATL/CH.3 | 404-555-6666 | Z | NO | |

FIG. 6

| PRODUCT 601 | NETWORK AFFILIATE 603 | TIME AD BROADCAST 605 | CALL TIME 607 | NPA[NXX] 609 | TPC RESPONDING 611 | OVERFLOW NUMBER 613 |
|---|---|---|---|---|---|---|
| A | ABC/NY | 6:02 | 6:03 ... TOTAL CALLS XXX 610 | 201 ... | 130 ... | 15 |
| B | ABC/NY | 10:03 | 10:05 ... TOTAL CALLS XXX | 404 ... | 130 ... | 10 |
| ... | ... | ... | ... | ... | ... | ... |
| Z | ABC/PHIL | 10:32 | 10:35 ... TOTAL CALLS XXX | 908[500] ... | 130 ... | 0 |

FIG. 8

| TIME PERIOD | NETWORK AFFILIATE | PRODUCT OR SLOT PRICE | ORIGINATING NUMBER NPA[NXX] | TERMINATING TELEPHONE NUMBER |
|---|---|---|---|---|
| 6:02-10:02 | NY/CH.7 | A | 212,201,908 | 301-555-1234 |
| 7:15 | NY/CH.7 | $75,000 | 212,201,908 | NONE |
| 7:30 | NY/CH.7 | $47,000 | 212,201,908 | NONE |
| 7:45 | NY/CH.7 | $20,000 | 212,201,908 | NONE |

CONTEXT-BASED TRANSACTIONS USING BROADCAST ADVERTISING

This is a Continuation of application Ser. No. 08/364,563 filed Dec. 27, 1994, now abandoned.

FIELD OF THE INVENTION

The present invention relates generally to processing of transactions relating to broadcast (e.g., television or radio) advertising, and, more particularly, to a system and method in which a person receiving or viewing an advertisement and wishing to initiate a transaction in response to the advertisement can dial a single, easy-to-use number assigned to a broadcast television or radio network, and in response be connected to a transaction processor or call center associated with the advertiser or sponsor of the advertisement.

BACKGROUND OF THE INVENTION

A large portion of advertising budgets is being spent by various businesses to reinforce consumer's "phone-number" memory. Examples of easy to remember numbers are 1-800-FLOWERS to reach a flower delivery service, and 1-800-CALL-ATT to make a long distance telephone call. Meaningful 800 address space is sparse, and the set of available easy to remember numbers will be depleted if current trends continue. Emerging direct-response radio and television advertisers who do not have an existing memorable number do not want to spend their precious resources on reinforcing the consumer's phone-number memory or, even on owning and administering a dedicated easy to remember number. This issue also affects "infomercials", which are lengthy, direct-response advertisements.

In addition, advertisers, advertising agencies and media buyers require information about the effectiveness of direct-response ads in each market, time slot, and television or radio show. This information is available today only if separate direct-response phone numbers are given when the same advertisement plays on different television or radio stations without significant playing-time separation.

SUMMARY OF THE INVENTION

In accordance with the present invention, each broadcast (e.g. television or radio) network, which may have multiple local (sometimes called "affiliated") television or radio stations each broadcasting in a different geographic area, is provided with one or more easy-to-use telephone numbers. The broadcast network, in turn, assigns one of these numbers to each of the local television or radio stations, thereby allowing advertisers to prominently display or refer to the assigned broadcast network's telephone number in direct-response television or radio advertisements broadcast by each local station in its respective geographic area.

Thus, for example, the American Broadcasting Company may have the numbers 1-800-CALL-ABC and 1-800-RING-ABC, and the Columbia Broadcasting Company may have the number 1-800-CALL-CBS. The American Broadcasting Company then assigns the number 1-800-CALL-ABC to its affiliated local television stations in, for example, New York City and Miami, but assigns the number 1-800-RING-ABC to its affiliated local station in Philadelphia, because there are some viewers in New Jersey who may receive programs from both local stations at the same time.

With respect to each easy-to-use telephone number available to a broadcast network, different advertisements broadcast on different local television or radio stations affiliated with or part of that broadcast network may then display or mention that same number, regardless of the geographic area in which the broadcast is received, and the time at which the advertisement is displayed. Thus, as an example, first and second different advertisements for Product A and Product Z may be broadcast at the same time, (6:02 AM) in New York City on affiliate channel 7 and in Atlanta on affiliate channel 3, respectively, and a third different advertisement for Product B may be broadcast at a later time (10:03 AM ) in New York on affiliate channel 7. All three advertisements include instructions to viewers to call the same, easy-to-use number, 1-800-CALL-ABC.

When a particular advertisement, e.g., for a product or service offered by a particular advertiser, is displayed on a TV program or mentioned on a radio program, viewers or listeners can dial the broadcast network's telephone number in response to the advertising, in order to initiate a transaction. The call is routed based upon its "context", to a specific terminating telephone number for a transaction processor or call center serving the advertiser associated with the advertisement. "Context" based processing is accomplished by using a call-routing database to uniquely associate each incoming call placed to the broadcast network telephone number with an advertiser's specific terminating telephone number, illustratively based upon the time period that the call is made, and the viewer or listener location where the call was originated, both of which together determine the particular advertisement to which the caller was responding. In the example given above, first and second calls placed from locations in New York City and Atlanta to 1-800-CALL-ABC, at 6:03 AM are routed to advertisers associated with Product A and Product Z, respectively, because the first and second calls originated from different locations, while a call placed from New York at 10:20 AM to the same number is routed to the advertiser associated with Product B, because the first and third calls originated from the same location, but at different times.

Advantageously, each broadcast network and its local stations can obtain access to the call-routing database, so that new advertising schedules can be entered into the call-routing database. In addition, each broadcast network and its local stations can update the routing database substantially concurrently with the decision to play certain advertising material. This is particularly important in the case of programs, such as sports events and talk shows, that are unpredictable in nature and therefore require flexibility in the playing time of advertising material.

Although each broadcast network generally has only a single local or affiliated television or radio station per geographic market area, to account for the possibility that some area overlaps may exist, the present invention optionally includes a voice-response system arranged to query the caller and receive one or more responses that can be used to resolve any ambiguity as to which advertisement the caller is responding. The voice-response system can also be used to resolve ambiguities that arise as a result of responses to advertisements that are playing in adjacent time periods. The information in the voice response system can be updated at the same time that the routing database is updated. Alternatively or in addition, the present invention contemplates the assignment of an additional easy-to-use telephone number (e.g., 1-800-RING-ABC) to a broadcast network that has two local stations (affiliates) that broadcast into overlapping geographic areas.

In accordance with another aspect of the invention, it is recognized that direct-response advertising may cause call-volume "spikes" for the advertiser's transaction processing system to which calls are routed. These spikes are mitigated with load-smoothing means, such as call-back capabilities and interactive voice-sessions, which may be implemented in a network-based processor and designed by the advertiser to match each specific direct-response advertisement.

BRIEF DESCRIPTION OF THE DRAWINGS

The present invention will be more fully appreciated by consideration of the following detailed description which should be read in light of the accompanying drawing in which:

FIG. 2 illustrates the information and an illustrative format for records contained in routing database 155 of FIG. 1;

FIG. 6 illustrates the format of a sample report that may be compiled in a processor having access to information available either in routing database 155 of FIG. 1 or in billing records;

FIG. 8 depicts the format of a second type of record that can be stored in routing database 155 of FIG. 1.

DETAILED DESCRIPTION

Figure 1:
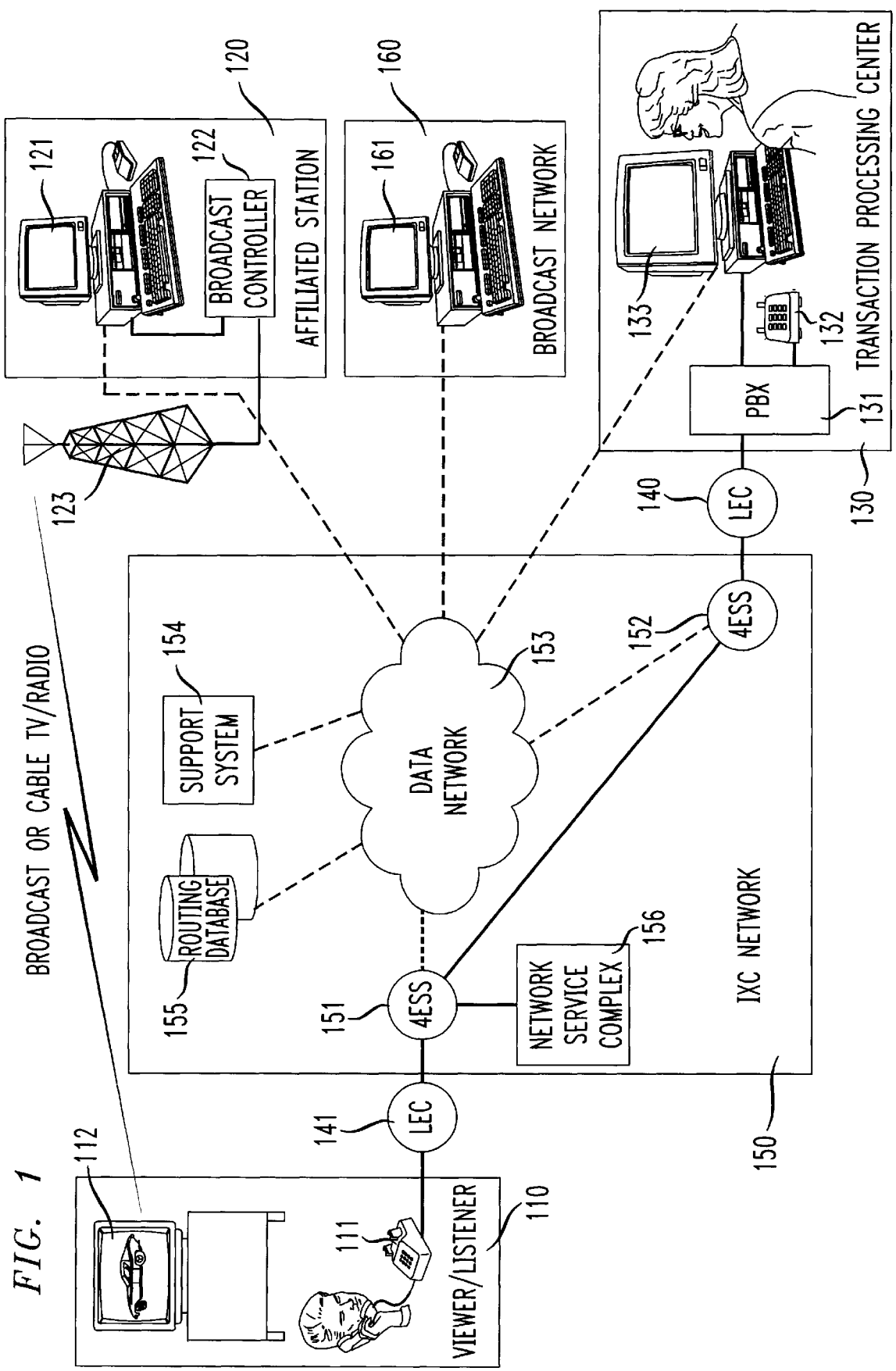
FIG. 1 is a block diagram illustrating the overall arrangement of a system in accordance with the present invention for context-based processing of transactions relating to broadcast (e.g., television or radio) advertising.

Referring first to FIG. 1, there is shown a block diagram illustrating the overall arrangement of a system in accordance with the present invention for context-based processing of transactions relating to televised advertising. The system and its operation would be essentially the same for advertising broadcast in conjunction with radio programs. In the following description, examples relating to televised advertising will be given.

Four principal participants are involved in each transaction: a viewer or listener at location 110, which is within the viewing area of a television station, a local or affiliated station 120, an advertiser's transaction processing center 130, and a broadcast network 160. Each of these participants is interconnected via a telephone network, which as shown in FIG. 1, consists primarily of an inter-exchange carrier (IXC) network 150 that may, for example, be part of the IXC network available through AT&T. In the arrangement of FIG. 1, viewer/listener location 110 and transaction processing center 130 are each connected to IXC network 150 via a local exchange carrier (LEC) 141, 140, respectively, although it is to be understood that direct connection that bypasses the LEC is also contemplated by the present invention. Affiliated station 120 and broadcast network 160 are shown interconnected to IXC network 150 via only data connections to data network 153, which are illustrated as dotted lines. However, it is to be understood that these locations would also be served by conventional communications lines which would be interconnected, for example, to LEC 140 and 4ESS™ switching system 152 in IXC network 150. It is also to be noted that, for ease of illustration, data network 153 is shown in FIG. 1 and described in the following description as a single data network. In reality, several different types of data networks may be used to carry messages between the different elements of the system, and the formats and/or protocols for these messages may be different. An illustrative packet data network would use the X.25 protocol.

At broadcast network 160, a broadcast network control processor 161 is arranged to assign one or more appropriate easy-to-use telephone numbers, such as 1-800-CALL-ABC or 1-800-RING-ABC, to its affiliated stations, including affiliated station 120. Concurrently, information relating the assignment is inserted in a routing database 155 in IXC network 150, which database may be implemented as a #2 Direct Services Dialing—Network Control Point (DSD NCP) available from AT&T Corp. This process is discussed more fully below, in connection with FIG. 3.

At affiliated station 120, a processor 121, operated under the control of stored program instructions that provide functionality described below, controls the operation of a broadcast controller 122 that in turn controls the television programming being transmitted by an antenna 123. When a direct-response advertisement sponsored by a particular advertiser that includes the easy-to-use telephone number assigned to the affiliated station is ready for broadcast, a message is sent to broadcast controller 122, causing the advertisement to be transmitted by antenna 123 and received remotely in a television 112 located in viewer/listener location 110. At approximately the same time, information in routing database 155 in IXC network 150 is updated to reflect the fact that this particular advertisement is being broadcast by this affiliated station into the geographic area that contains viewer/listener location 110. This is accomplished, illustratively, through a message transmitted from processor 121 through data network 153 to a support system 154, which, in turn, appropriately processes information provided by the affiliated station and sends an update message to routing database 155, also using data network 153. Note that, in some implementations, information may be inserted in routing database 155 directly, without requiring the use of support system 154. Note also that coordination between the operation of broadcast controller 122 and information that is provided to routing database 155 in IXC network 150 may be provided from other sources, including from broadcast network control processor 161.

At viewer/listener location 110, a person watching television 112 will see the advertisement and the easy-to-use telephone number, e.g., 1-800-CALL ABC, contained therein. If the viewer/listener is interested in responding to the advertisement, he or she may initiate a transaction by calling that number from a telephone 111. Because, in this example, the telephone number is an "800" number, indicating that the call can be completed as a toll-free call, the call is routed through LEC office 141 that serves telephone 111 to the appropriate IXC associated with the dialed toll-free number, illustratively IXC network 150. In IXC network 150, the call is connected to a switch, illustratively a program controlled 4ESS electronic switching system 151 available from AT&T Corp. Here again, the fact that the call is an 800 call indicates to switching system 151 that special service processing is necessary. In accordance with known techniques, special service processing contemplates translation of the 800 number into a network routing number or terminating telephone number needed to connect the call to the appropriate end destination. In accordance with the present invention, the translation is performed on a context sensitive basis, as indicated below.

At transaction processing center 130, attendants can receive telephone calls placed to an advertiser in response to an advertisement. The calls are received in a PBX 131 (which may be a Definity® PBX available from AT&T Corp.) that includes an automatic call distributor (ACD) functionality, so that the audio portion of the calls can be delivered to the telephone 132 or headset of an available operator, and, if desired, information associated with the call and/or the caller can be delivered to and displayed on a processor 133.

To appropriately route the call originated by the caller at viewer/listener location 110, a query (in the form of a Signaling System 7 (SS7) signaling message) is launched by switching system 151 to routing database 155. Recall that, as stated earlier, information was provided to routing database 155 from processor 121; in accordance with this invention, this information includes (a) a time at which a particular advertisement will be broadcast, and (b) the terminating telephone number for transaction processing center 130 which is arranged to handle inquiries and orders for the advertiser mentioned in the advertisement.

The query, which includes information identifying the dialed number as well as information identifying viewer/listener location 110, is used to retrieve the routing number or terminating telephone number that corresponds to PBX 131 at transaction processing center 130. In this way, a call from a person at viewer/listener location 110 is routed to a destination on a context sensitive basis. This means that (a) calls placed to a particular dialed number at a particular time may be routed to different destinations, depending upon where the call originated from, since different viewers in different geographic areas may view television programming from different affiliated television stations, and (b) calls placed to a particular dialed number from a given destination will be routed to different destinations, depending upon the time the call originated, since a viewer at that location will view different television programming with different advertisements over a sufficiently long time interval. Examples of context sensitive routing will be given following the description of FIG. 2, below.

There are several situations, discussed in more detail below, in which ambiguity may exist with respect to the appropriate routing or treatment to be afforded to a call placed to a particular easy-to-use telephone number, either because the call originated from a geographic area served by two or more television stations affiliated with the same broadcast network, or because two or more different advertisements were broadcast in time intervals that were close together in time. For this reason, a network services complex (NSC) 156 is provided in IXC network 150. NSC 156 may be an interactive voice platform, sometimes called a voice response unit or VRU arranged to prompt the caller to provide additional information, such as (a) the station number that the caller was viewing, or (b) the advertisement (e.g., product or service) in which the caller is interested. With this information, any ambiguity can be resolved, Before proceeding to a description of FIG. 2, it is to be noted here that although FIG. 1 illustrates an embodiment in which the output of broadcast controller 122 is applied to an antenna 123 for "over-the-air" transmission, it is to be understood that the present invention will also be applicable to television programming received via cable TV distribution or other appropriate means.

Referring now to FIG. 2, there is shown an illustration of the information contained in routing database 155 of FIG. 1. The information can be organized as a series of records, one record for each broadcast network's telephone number, with each record containing what can be called a routing table including rows and multiple columns. For the purposes of illustration, it is assumed that the record of FIG. 2 contains information for the American Broadcasting Company, which has been assigned the number 1-800-CALL-ABC. It is to be understood that the easy-to-use number may be, but is not limited to, an "800" or toll free number. Rather, any number may be used, provided that calls made to the number can be completed on an "intelligent routing" basis, meaning that calls having different characteristics can be given different routing and handling treatment. In this context, characteristics of interest are "when" and "from where" a call originated. Much has been written about intelligent routing; see, for example, an article entitled "Customer Control of Network Services" by G. A. Raack et al., IEEE Communications, Vol. 22, No. 10, October, 1984; and U.S. Pat. No. 4,611,094 issued to Asmuth et al. on Sep. 9, 1986, which is incorporated herein by reference. For the present purposes, it is understood that intelligent call routing is implemented by 4ESS switching system 151, operating in conjunction with information obtained from routing database 155.

Where programs broadcast from more than one television station affiliated with a particular broadcast network are viewable from a geographic region or location, different broadcast network's telephone numbers may be assigned to each of the individual affiliated stations, in order to avoid ambiguity. This is described more fully below, in connection with FIG. 3. Thus, for example, if two ABC affiliated stations broadcast in the New York metropolitan area, one affiliated station may use 1-800-CALL-ABC, and the other may use 1-800-RING-ABC. The present invention will nevertheless allow multiple advertisers on each affiliated station to use the same (in this example, two) telephone numbers, as described more fully below.

In the record of FIG. 2, each separate line in the routing table generally relates to a specific televised advertisement that may be broadcast by a television station affiliated with the broadcast network to which the record pertains. Each column (field) in the routing table contains information that, in essence, defines or identifies the advertisement, the context in which the advertisement is broadcast, and the telephone number to which calls responding to the advertisement may be placed. Supplemental or descriptive information may be included in some fields, and may be provided for the purposes of administration rather than for use as a determinant with respect to "context". Thus, in column 224, information identifying the advertisement (e.g. advertised product) is included in FIG. 2, principally for the purposes of explaining the present invention. As used herein, the "context" for an advertisement can be based, at a minimum, upon (a) the geographic area where the advertisement is broadcast, and (b) a time interval during which the information pertaining to a particular advertisement is "active" or valid. Other factors may also define context, as described below.

With respect to the geographic area where the advertisement is broadcast, the present invention advantageously uses an indirect correlation, such that telephone numbering information is used to represent corresponding geographic information. This can be done because telephone number assignments are generally based upon geography. In this connection, reference may be made to U.S. Pat. No. 4,954,958 issued to Savage et al. on Sep. 4, 1990, for a description of a system which uses correlations between telephone numbers and locations. For example, specific "area codes"

(sometimes referred to as Numbering Plan Area (NPA) digits) represent relatively large geographic areas, such as entire states or cities. Thus, the area code 212 represents New York City, the area code 201 represents northern New Jersey, and the area code 908 represents central New Jersey. Specific telephone exchanges portion of a telephone number represented in the form NPA-NXX-XXXX) represent somewhat smaller geographic areas, such as smaller cities or towns. For example, numbers of the form (908) 949-XXXX represent the municipality of Holmdel, N.J., the site of one of the principal locations of AT&T Bell Laboratories. This finer gradation may be particularly advantageous when an advertisement is carried on a cable network, rather than on broadcast television, because in the cable environment, programming may be directed to households that are concentrated in a limited and well defined portion of a larger region defined by a particular telephone area code. In the record of FIG. 2, column 220 thus contains originating telephone number information corresponding to the geographic locations where a televised advertisement from a particular television station would be broadcast and thus received by viewers who are potential callers.

Column 221 contains information defining a time interval during which the information for a particular advertisement is "active" or valid. This interval can be defined by start and end times, if the length of the interval is variable, or simply by either a start or end time, if the length of the interval is fixed. Although not shown in FIG. 2, it will be understood that the "times" in column 221 may also include information relating to the calendar "date" on which such times occur, so that in a specific realization of the invention, the information in the column may be in the form yy-mmm-dd-hh-mm, where yy represents the year, mmm represent the month, dd represent the day, hh represents the hour in military time format, and mm represents the minute. In one embodiment of the present invention, different advertisements broadcast by a particular television station into one geographic area that display and utilize the same broadcast network's easy-to-use telephone number are spaced apart by about 15 minutes. Thus, the time interval information in column 221 for these advertisements would indicate 15 minute intervals, beginning at the time the advertisement is broadcast, therefore allowing time for a person to see the advertisement and to get to a telephone to dial the displayed broadcast network's easy-to-use telephone number. Note here that, as discussed in further detail below, information defining the time interval during which a particular entry is active or valid may be changed in various ways, such as by an affiliated station, and entered directly into column 221 in the appropriate record in routing database 155 by means of a data message sent from processor 121 via data network 153 and support system 154. Also, information defining the time interval during which responses may be made to an advertisement using the easy-to-use telephone number may be included in the advertisement itself. For example, the advertisement may announce that "Product A may be ordered by dialing 1-800-CALL-ABC during the next 15 minutes."

Column 222 contains information specifically identifying the television station that is associated with a particular advertisement. This information is useful for administration and explanation purposes, and also for resolving ambiguities when, as explained below, there is some overlap of the geographic areas in which affiliates of a particular broadcast network may broadcast.

Column 223 contains a terminating telephone number (or routing number) for each advertisement. Thus, for each advertisement, each line in the record of FIG. 2 indicates where a call placed to the broadcast network's easy-to-use telephone number displayed in the advertisement should be routed. This would typically be the telephone number for PBX 131 in the advertiser's transaction processing center 130 of FIG. 1, where attendants are provided to handle transactions responding to the advertisements. The telephone numbers in column 223 can, like the information in column 221, be entered and/or changed in various ways, such as by affiliated station personnel, and entered directly into column 223 in the appropriate record in routing database 155. In the case of a message originated in the affiliated station 120, this is done by means of a data message sent from processor 121 via data network 153 and support system 154; in the case of a message originated from advertiser's transaction processing center 130, this is done by means of a data message sent from processor 133 via data network 153 and support system 154 to routing database 155. Note here that permission to alter specific fields in the table of FIG. 2 may be selectively managed. For example, authorization codes may be necessary to make changes, and the codes may be provided in messages sent by broadcast network 160 to affiliated station 120, and in messages sent by affiliated station 120 to particular advertisers.

The exemplary data contained in the individual lines 201–209 in FIG. 2 relate to six different advertisements, which were selected to illustrate various different situations which may occur in a typical implementation of the present invention. On line 201, information relates to an advertisement for Product A this is broadcast by local channel 7, the ABC affiliate in New York City, at approximately 6:02 AM. This station broadcasts in the New York/Northern New Jersey area, which corresponds to area codes 212, 201 and 908 in column 220. Calls generated in response to this advertisement will likely occur in the time interval beginning at 6:02 AM, when the advertisement is actually seen, and continue for about 15 minutes, since this is the time interval in which most viewers would typically respond to a direct-response advertisement of this type. However, since the next direct-response advertisement using the present invention is not scheduled to be broadcast in New York on channel 7 until 10:03 AM, the time period for the advertisement of Product A can be extended. Accordingly, the information in column 221 defines and interval between 6:02 and 10:02 AM. (Note that the time period is subject to change, as discussed more fully below.) Finally, the advertiser for Product A wants calls relating to that product to be routed to a call center having the number (301) 555-1234, so that number is set forth in column 223.

On line 202, information is listed for a subsequent advertisement to be broadcast on the same local channel 7 that takes advantage of the present invention. This advertisement is for Product B (see column 224), has a different time interval in column 221, and a different terminating telephone number in column 223, since the advertiser for Product B is different from the advertiser for Product A. Since the advertisements represented by lines 201 and 202 are widely spaced in time, there is no need to resolve ambiguity between calls made in response to these two advertisements.

On line 209, information is listed for an advertisement for Product Z to be broadcast on a different channel, namely channel 3, the ABC affiliate in Atlanta, during the same time as the advertisement for Product A is being broadcast in New York on channel 7. Calls originating from the Atlanta area, having area code 404 (column 220) placed to the same easy-to-use telephone number are completed to a different terminating telephone number, namely 404-555-6666, as shown by the information entered in column 223.

On line 203, information is listed for the same advertisement (for Product A) that is shown in the New York area at 6:02 AM. This advertisement is being broadcast by local channel 3, the ABC affiliate in Atlanta, at 10:03 AM, and will be received by viewers in the 404 area code, which is indicated in column 220. The Atlanta affiliate is broadcasting another advertisement, for Product C, at 10:19 AM, as indicated on line 204 in FIG. 2. This means that calls placed to the same broadcast network's number will be routed to (301) 555-1234 only up to 10:18 AM, and thereafter will be routed, in accordance with the information in column 223, to a different number, (908) 555-1111, starting at 10:19 AM. When advertisements are broadcast in close time proximity to each other, so that the time intervals in column 221 are close together, as they are on lines 203 and 204, an ambiguity may arise when the first time period is relatively short, since calls responding to one advertisement may overlap into a time period relating to a different advertisement. In order to resolve ambiguity between calls relating to products A and C that may be made during adjacent time slots, the present invention provides additional information, in the form of a voice prompt "yes/no" indicator, in column 225 in the records in routing database 155, indicating that an ambiguity exists. If the indicator in this field is "yes", a routing number (e.g., RRR-SSS-TTTT) in column 226, representing stored information in routing database 155, is used to route the call not to the terminating telephone number in column 223, but rather to the network services complex (NSC) 156 of FIG. 1. Additional information in column 226 is sent to NSC 156, identifying, for example, which products were involved, so that the appropriate stored announcements, which constitute a disambiguating script, can be played. With this arrangement, the caller is prompted to provide additional information, such as (a) the station number that the caller was viewing, or (b) the advertisement to which the caller is responding, so that any ambiguity can be resolved, and the call routed to either of the terminating telephone numbers listed in column 223, lines 203 or 204.

Lines 205 through 208 illustrate the possibility that two different television stations that are affiliated with the same broadcast network, in this case ABC, may broadcast different advertisements, for Products D and E, respectively, at the same time, and that the geographic area, New York and Philadelphia, respectively, in which the broadcasts may be viewed may, to a certain extent overlap. Thus, as is seen in FIG. 2, the information in column 221 is the same, indicating that both advertisements will be "active" during the same time intervals, between 10:32 and 11:40 AM. Lines 205 and 206 contain, in column 220, the area codes for which there is no ambiguity. Thus, in this example, area codes 201, 212 and a portion of area code 908, limited to exchanges 200 to 499, will receive the advertisement broadcast from New York channel 6, which relates to Product D, and calls from telephones with these area codes/exchanges will be routed to terminating telephone number 212-555-2222. Likewise, area code 215 will receive the advertisement broadcast from Philadelphia channel 9, which relates to Product E, and calls from telephones with this area code will be routed to terminating telephone number 212-555-3333. On lines 205 and 206, there is no ambiguity, and the indicator in column 225 is "no".

In the geographic area serviced by area code 908, exchanges 500-999, there is an overlap and a consequent ambiguity, since these areas receive broadcasts from both broadcast network affiliates, and may thus see different advertisements at the same time, each of which display the same broadcast network's telephone number, e.g., 1-800-CALL-ABC. This ambiguity is resolved in the same manner as the time interval ambiguity previously discussed.

Specifically, a "yes" result is inserted in field 225 for both lines 207 and 208. This will result in any call made to the broadcast network's telephone number during the entire time interval between 10:32 and 11:40 being routed to network services complex 156 for voice prompting. For this purpose, the routing number, e.g., RRR-SSS-TTTT, needed to route the call to network services complex 156 is included in column 226, as is the identification of products D and E. Note here that the information in column 226 could also identify the channels on which the advertisements producing the ambiguity were broadcast.

Note here that while the foregoing example assumed that a contiguous group of exchanges 500–999 in the 908 area code represent telephones in contiguous geographic areas, this was done only for the purpose of convenience in illustration, and that such is not normally the case. Rather, the information in column 220 could consist of a long list of separate exchange identifiers. Also note that the same transaction processing center (with the same terminating telephone number) can be used to process calls responding to several different advertisements. If this is done, then the automated or live attendants in the transaction center will obtain information from the caller, illustratively through responses to prompts, indicating which advertisement elicited each call.

In the exemplary advertisements discussed above, the six different advertisements for different products each included an easy-to-use telephone number. Additional advertisements may be broadcast of a more general nature. In these generalized advertisements, viewers are educated and advised that an easy-to-use number has been assigned to the broadcast network with which the station that they are viewing is affiliated, that calls may be made to that same number to respond to different advertisements, and that this arrangement is a convenience to the viewers, since the viewer/listeners will not be required to remember individual numbers in order to initiate transactions responsive to different advertisements.

Figure 3:
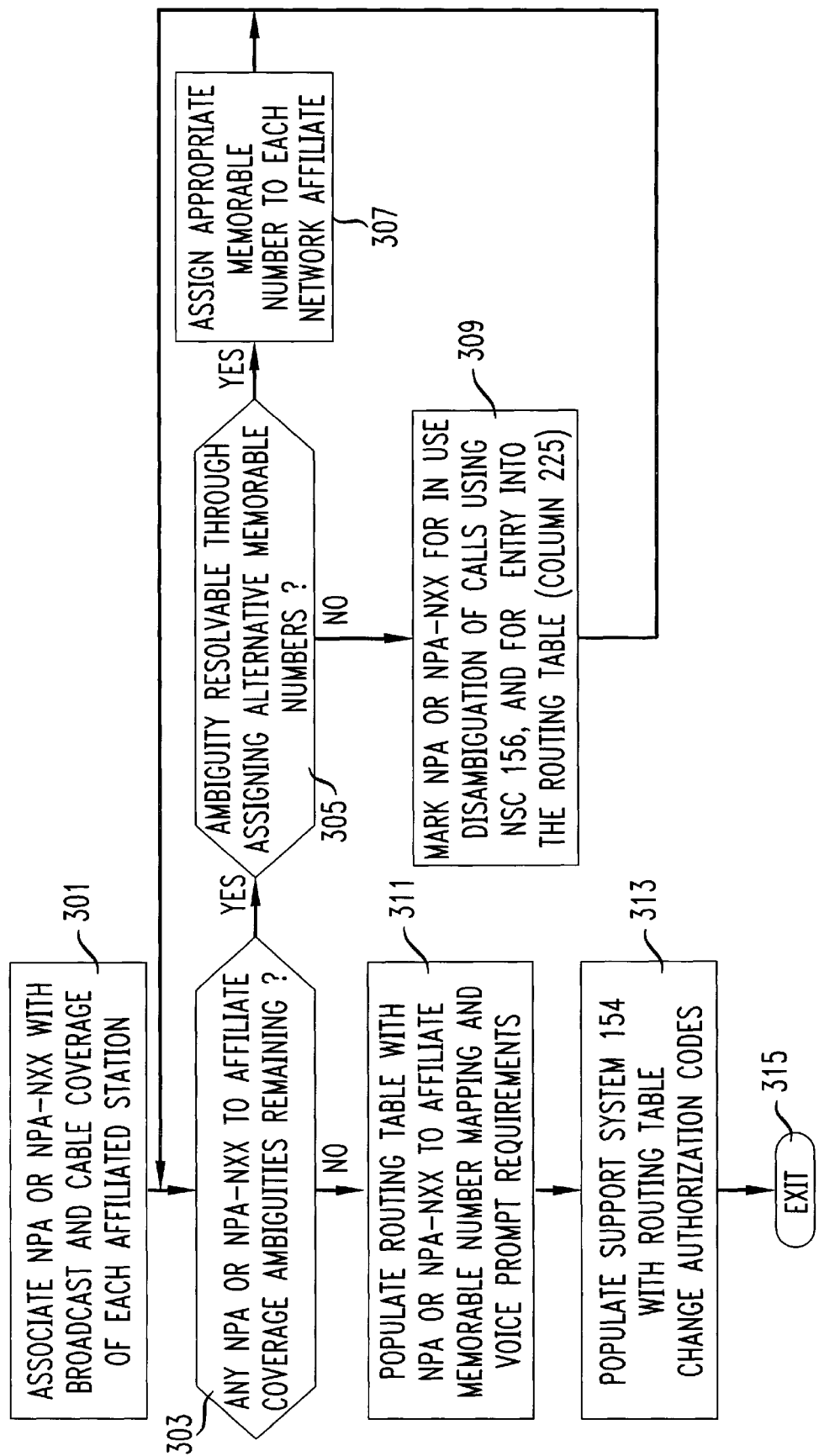
FIG. 3 is a flow diagram illustrating the process performed by broadcast network control processor 161 of FIG. 1.

FIG. 3 is a flow diagram of the process performed in broadcast network control processor 161 in broadcast network 160. Briefly, the purpose of this process is to populate some of the fields in the one or more records in routing database 155. The records being populated pertain to each of the easy-to-use numbers assigned to the broadcast network performing the process; the fields being populated include the information in column 220, which associates area codes and exchanges with different affiliated stations, and the information in columns 225 and 226, which determines if there is an ambiguity that needs to be resolved by handling in NSC 156, and if so, the disambiguating script that is used in NSC 156 to resolve the ambiguity.

The process of FIG. 3 begins in step 301, in which an association is made between (a) area codes and exchanges within those area codes, and (b) any one or more affiliated television stations that broadcast (or provide programming, in the case of cable television) to locations in the areas served by those area codes and exchanges. In this step, maps of the coverage or franchise areas of the affiliated stations are in effect overlaid with maps of the telephone company central office exchange locations, so that a table is constructed with the desired information. Note that in many cases, entire area codes are served by one affiliate, so that breakdown by telephone exchange is not necessary. In other cases, breakdown by exchange is needed.

Next, in step 303, a determination is made as to whether there are any ambiguities remaining to be resolved. An ambiguity is said to exist when, for a given area code and exchange, there is more than one affiliated television station broadcasting (or providing cable service) to the geographic region served by telephones with numbers belonging to that area code or exchange. If a YES result occurs, the process proceeds to step 305, in which a determination is made as to whether the ambiguity is resolvable by assigning different alternative easy-to-use numbers to the affiliated station. This determination would depend upon whether the broadcast network has different numbers (e.g., 1-800-CALL-ABC and 1-800-RING-ABC) and whether the broadcast network wishes to use such numbers in a given market area. If a YES result occurs in step 305, then an appropriate easy-to-use number is assigned to each affiliated station in step 307, and the process returns to step 303. On the other hand, if a NO result occurs in step 305, then the area code and/or exchange represents potential callers in a geographic area that could see more than one televised advertisement broadcast on different channels that contain the same easy-to-use number and that relate to different advertisements. To avoid this ambiguity, in step 309, the record in routing database 155 for this area code and/or exchange is marked with a YES in column 225, indicating that calls originating from telephones with this area code and/or exchange should be routed to NSC 156, where overlapping responses to different advertisements are resolved. The process then also returns to step 303.

After all ambiguities have been resolved, and a NO result occurs in step 303, the process of FIG. 3 proceeds to step 311, in which the easy-to-use numbers assigned in step 307 are stored in the records in NSC 156. In particular, the appropriate records are selected, corresponding to the one or more easy-to-use numbers for the broadcast network involved. For each such number, information is inserted in columns 220 and 222. If there are and additional voice prompt requirements associated with calls from a particular area code or exchange, these can be entered at this time. Also, note that the easy-to-use telephone numbers to be used by each affiliated station would be provided to advertisers and advertising agencies, so that television advertisements could be prepared which contain the easy-to-use numbers in connection with the responses to the advertisements.

In step 313, support system 154 of FIG. 1 is populated with authorization codes and other information needed to administer and control access to the information in NSC 156. For example, affiliated stations are provided with access codes needed to update information in NSC 156, and these codes are stored in support system 154. When a call is made to make an update, an affiliate-specific authorization code presented by the caller is checked against the stored code before access is permitted. Following step 313, the process of FIG. 3 is terminated in step 315.

Figure 4:
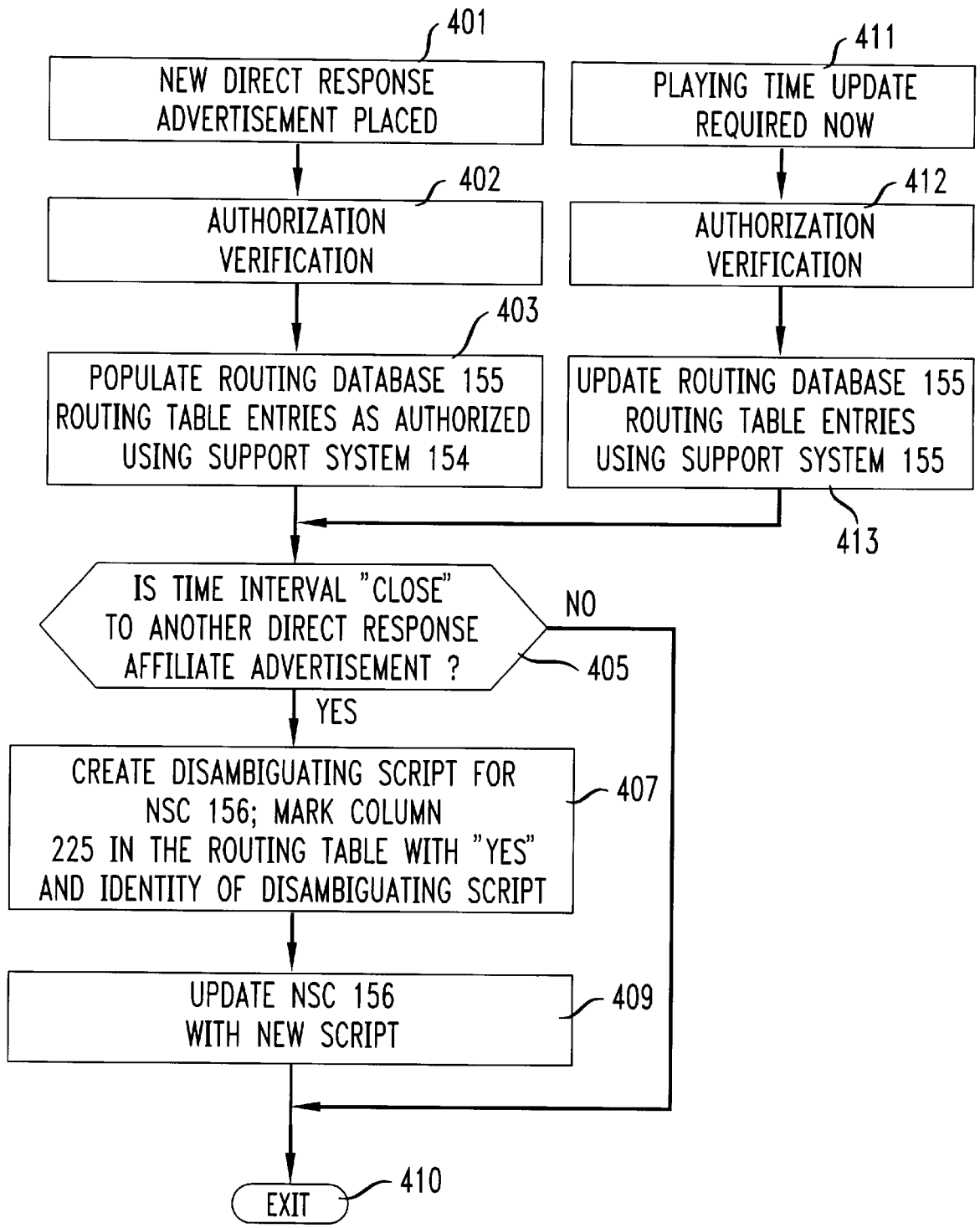
FIG. 4 is a flow diagram illustrating the process performed by affiliated station processor 121 of FIG. 1.

FIG. 4 is a flow diagram of the process performed by affiliated station processor 121 of FIG. 1. This process can be triggered in two ways, either in step 401, when a new direct-response advertisement is to be processed in accordance with the present invention, or in step 411, when information relating to an existing advertisement is to be changed or updated. (Note here that the process of FIG. 4 also begins in step 401 when any changes other than playing time changes, are to be made in the information in routing database 155. These changes may relate to cancellation of an advertisement, correction of a terminating telephone number, etc.) The process beginning with step 401 will be described first.

First, in step 402, the authorization of the requester to enter or change information in routing database 155 is determined. This may be accomplished by checking a pre-assigned password, requiring entry of a voice sample, or by performing any other similar security process. Next, in step 403, the routing table in routing database 155 is populated with information relating to the new advertisement. This process is accomplished by transmitting a data message from broadcast controller 122 via data network 153 to support system 154, and upon authorization, by transmitting a further data message from support system 154 to database 155. (In some arrangements, other forms of access, including direct access into database 155 may be permitted.) The information provided includes the time period during which an advertisement is active, to be entered in column 221, the terminating telephone number for the transaction processing center associated with responses to the advertisement, to be entered in column 223, and optionally, identification of the advertisement (e.g., a particular product or service), to be entered in column 224. This identification can be important, particularly if the product or service name is used in the announcement or prompt played by NSC 156. The information is entered in the appropriate record, in the rows corresponding to the broadcast network affiliate, as designated by information in column 222.

Next, in step 405, a determination is made as to whether the active time interval for the newly added advertisement overlaps or is so close to another existing time interval as to be likely to cause ambiguity. This is a function of the response time overlap and/or the interval between advertisement broadcast times. If there is no overlap and the intervals are not too close, a NO result occurs in step 405, and the process terminates in step 410. If there is overlap or the intervals are too close, a YES result occurs in step 405, and the process proceeds to step 407. In this step, a YES is inserted in column 225 to indicate that calls made during the particular active time interval and from the particular area code and/or exchange being processed in step 407 are to be routed to NSC 156. In addition, information is sent to NSC 156 to generate an appropriate script to handle such calls, and information is inserted in column 226 to indicate which script is to be played in response to such calls. Subsequently, in step 409, the new script is supplied to NSC 156, so that calls routed there will be presented with the appropriate questions/announcements to service them.

If the process of FIG. 4 is initiated in step 411 because information relating to a previously processed advertisement must be updated, the process proceeds first to step 412, which is identical to step 402, previously described, and then to step 413, in which the information in the routing table in routing database 155 is updated in accordance with new information. The updates relate to the same information that is processed in step 403, described earlier. A situation requiring an update will occur often, particularly where an advertisement is part of an unpredictable television program, such as a sports event. Note here that there must be coordination between the updated information supplied to routing database 155 and the actual broadcast of particular advertisements to which the updated information pertains. One way to accomplish this coordination is to generate the updated information in broadcast controller 122 in affiliated station 120, and to arrange the same controller to also control the programming broadcast by the affiliated station. By virtue of this coordination, last minute changes may be made with respect to when advertisements are broadcast, and how call made to the broadcast network's easy-to-use number that are included in the advertisements will be processed. Following the completion of step 413, the process continues with step 405, described above, since schedule changes may result in new disambiguation needs.

Figure 5:
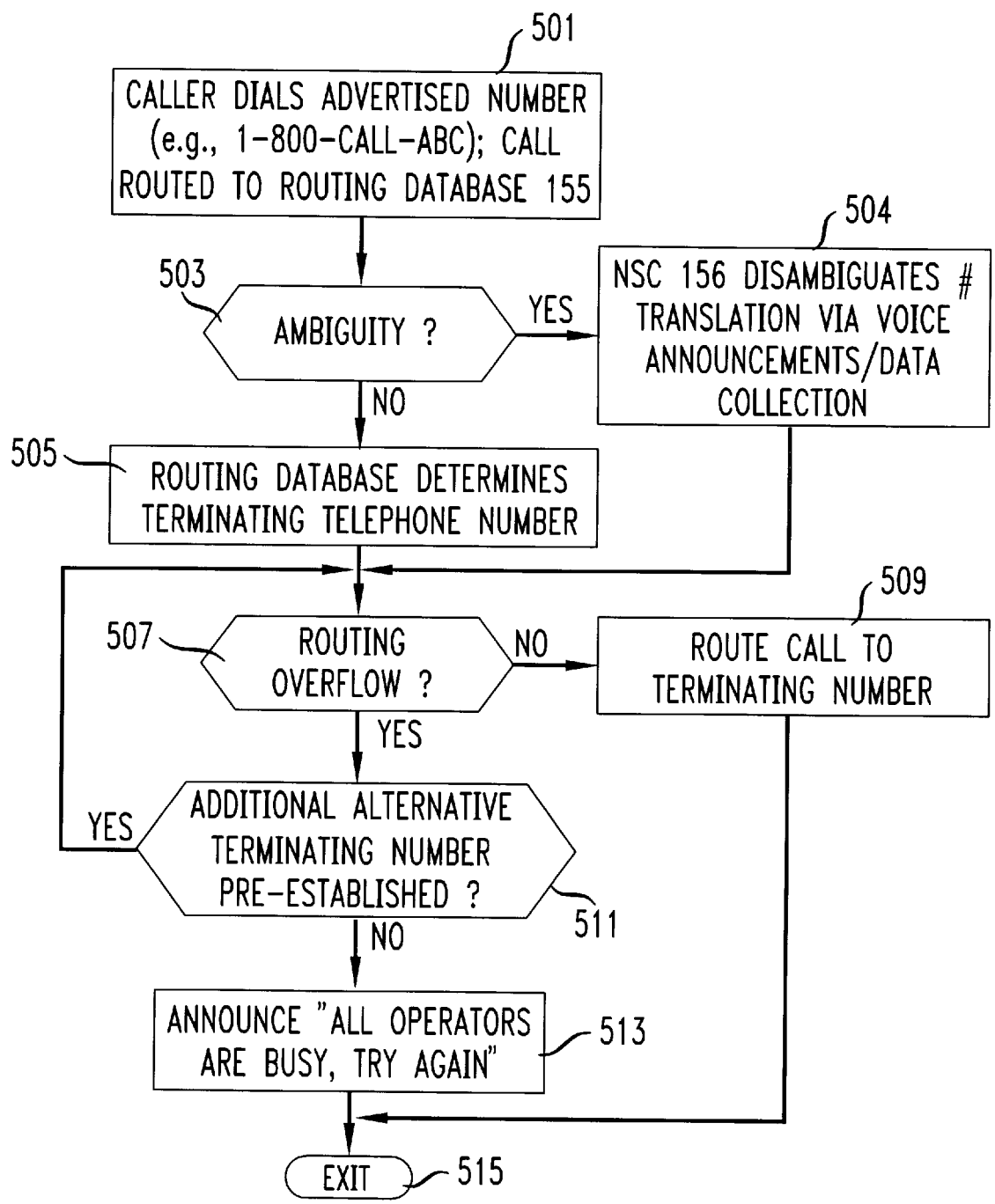
FIG. 5 is a flow diagram illustrating the call completion process triggered by a caller at viewer/listener location 110.

FIG. 5 is a flow diagram of the call completion process triggered by a caller at viewer/listener location 110. Initially, in step 501, a caller dials the easy-to-use broadcast network's number, e.g., 1-800-CALL-ABC that appeared in a televised advertisement. This call is recognized as an 800 call requiring intelligent network treatment, and a query is launched by switching system 151 to routing database 155 to obtain routing information. In step 503, the appropriate record for the dialed number is retrieved, and the appropriate entry in the routing table, corresponding to the originating area code or exchange is ascertained. A determination is then made as to the value of the entry in column 225, indicating whether or not an ambiguity exists. If a YES result occurs in step 503, the call is routed to the NSC (such as NSC 156) identified by the routing number in column 226, and other information is sent to the NSC to designate which script should be played. In step 504, the caller is presented with the appropriate stored script, containing questions or announcements that will determine how to complete the routing of the call. If a NO result occurs in step 503, the appropriate terminating telephone number is determined in routing database 155 in step 505, using the information in column 223.

Following completion of step 504 or 505, an optional process may be performed in steps 507–513, in order to use alternate routing to avoid overflow conditions that may be caused when a large number of calls are routed to the same terminating telephone number or the same NSC within a short period of time. Specifically, with this arrangement, a determination is next made in step 507 as to whether an overflow situation exists, such that too many calls have already been routed to the particular terminating telephone number or NSC. If a NO result occurs in step 507, the call is routed to the terminating number in step 509, and the process of FIG. 5 is terminated in step 515.

If a YES result occurs in step 507, and it is determined in step 511 that an alternative number does not exist, then the calling party is routed to an announcement facility in step 513, indicating that all operators are busy. Alternatively, the call may be routed to a platform in IXC network 150, which provides a service such as the InfoWorx® interactive voice service available from AT&T Corp. There, the caller is engaged in an interactive voice session pre-arranged by an advertiser, in which specific information may be obtained from the caller and stored for later access from the advertiser, for example, using the processors in transaction processing center 130. The process then terminates in step 515. On the other hand, if a YES result occurs in step 507, and it is determined in step 511 that an alternative number does exist, then the process returns to step 507, to determine if an overflow condition exists with respect to the alternate number.

During the call completion process, calling party ANI information is transmitted in the query from switching system 151 to routing database 155, and used to define the context of the call by matching information in column 220 for one of the advertisements. The ANI information normally includes the entire telephone number of the calling party, including both the area code (NPA) as well as the exchange (NXX) information. However, there will usually be a small number of cases in which only the originating NPA is captured by switching system 151. In this event, routing database 155 may be arranged to recognize the existence of an ambiguity, and responsive thereto, to route the call to NSC 156. As a result, the caller can be prompted, through one or more announcements, to choose between several advertisements. Input signaling from the caller, typically in the form of DTMF digits or voice inputs, are collected by NSC 156, interpreted or decoded, if necessary, and forwarded to switching system 151 or routing database 155 for subsequent use in the call completion process.

If, during the process by which routing database 155 is queried, an error should occur, such as might be caused by an unexpected digit or a time-out condition, the call is advantageously also routed to NSC 156, so that an announcement can be made, and the call terminated in a way that will encourage the caller to retry the call within the designed response time interval, or to a different telephone number.

FIG. 6 illustrates a sample report that may be compiled in a processor having access to information available either in routing database 155 or in billing records (sometimes called Automatic Message Accounting or AMA records) relating to calls made using the present invention. Such processor may be a processor in support system 154, or may be processor 121 in affiliated station 120, processor 161 in broadcast network 160, processor 133 in transaction processing center 130, or another processor having suitable interfaces to database 155. The report is compiled by aggregating, sorting and if desirable, summarizing information relating to specific calls and call characteristics, such as information identifying the number of times that each easy-to-use telephone number assigned to a broadcast network is called from each particular geographic area that is associated with a specific broadcast network affiliated station, the time that the call was received or processed, and the call disposition. The report may include an identification of the advertisement in column 601, an indication of the affiliate that broadcast the advertisement, in column 603, and the time that the advertisement was broadcast in column 605. Data in columns 607 and 609 indicates the times and NPA/NXX originating location information, in tabular form and summarized in graphical form (610) showing number of calls as a function of time following broadcast, for individual responses to the advertisement. The identity of the transaction processing center that handled the calls made in response to an advertisement may be listed in column 611. Thus, while the present invention illustrates a single transaction processing center 130 in FIG. 1, it is to be understood that advertisers may desire to have multiple centers, and to distribute calls among the centers in accordance with their business needs. This distribution can be accomplished using telemarketing management systems such as that shown in U.S. Pat. No. 5,164,983 issued to P. Brown et al. on Nov. 17, 1992. For the purposes of simplification, various other centers are not shown in FIG. 1, so that the information in column 611 relates only to center 130. If calls to a transaction processing center were re-routed due to overflow conditions, the number of overflow calls may be set forth in column 613.

In FIG. 6, sample information is shown for three advertisements for products A, B and Z. Details of the information that would be contained in the various columns is not shown, and persons skilled in the art will realize that various formats may be used, and the data content and presentation adjusted to suit the individual needs of different advertisers and television executives. The report illustrated in FIG. 6 may be provided in printed form, or may be sent to processors 121, 161 or 133 in electronic form.

It is to be noted that the AMA record made at switching system 151, under the control of routing database 155, would normally contain both the dialed 800 number (e.g., the broadcast network's telephone number 1-800-CALL- ABC) and the terminating telephone number obtained by querying routing database 155. However, in the case of a transaction processing center that is directly connected to a terminating switch in the interexchange carrier network, such as by a connection using Megacom® Service from AT&T, the terminating number may be a non-dialable APN number used to route the call to the appropriate trunk group on the terminating switch. In this case, that APN routing number would be included in column 223 of the record of FIG. 2, and this number would be used to identify particular advertisers, for the purposes of generating reports concerning the effectiveness of particular advertising.

Figure 7:
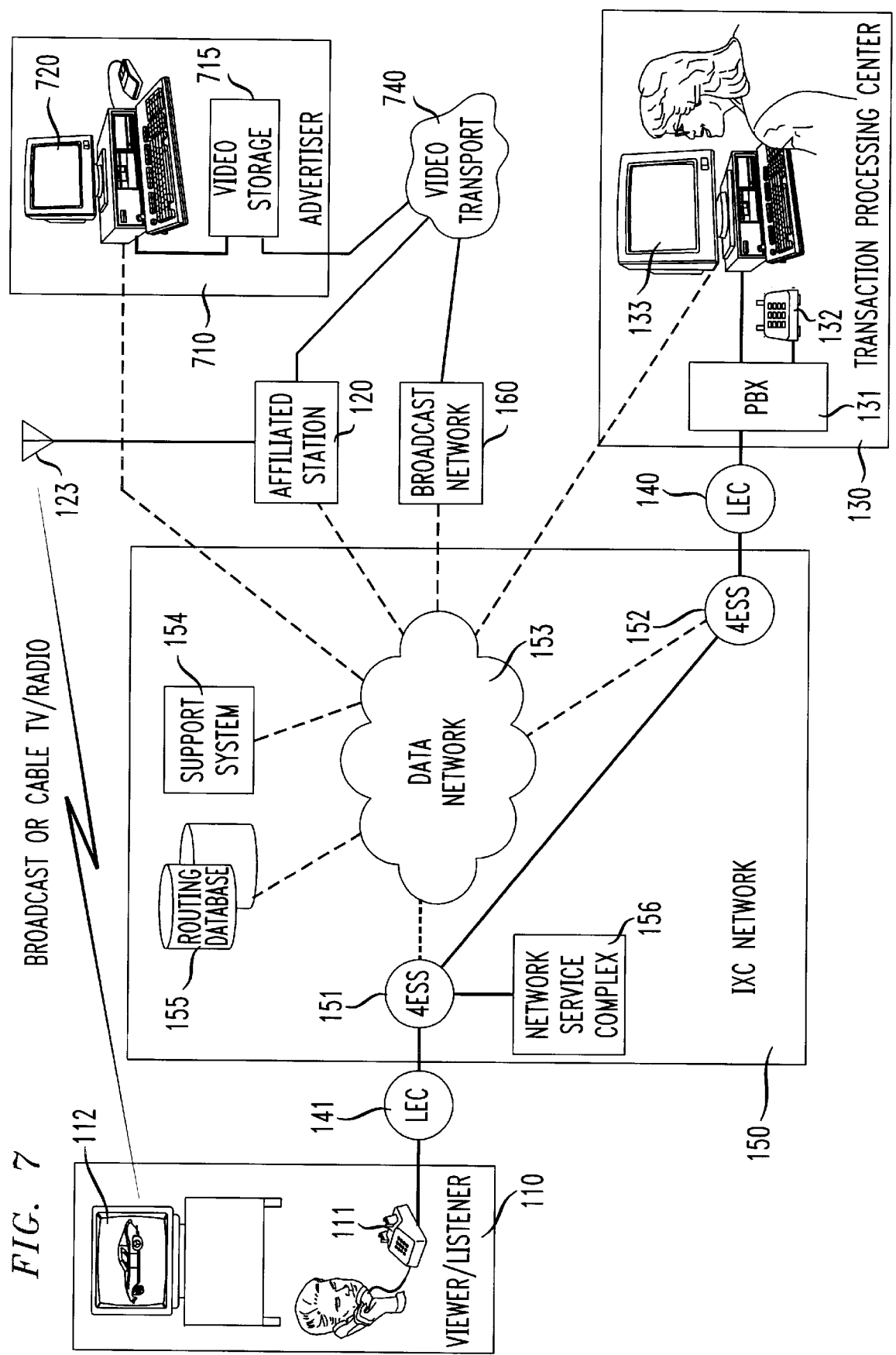
FIG. 7 illustrates an embodiment of the present invention in which the arrangement of FIG. 1 is modified to include interaction with an advertiser.

Referring now to FIG. 7, there is shown an embodiment of the present invention in which the arrangement of FIG. 1 is modified to include interaction with an advertiser 710. This arrangement would be useful where advertisers participate directly in the advertising process, provide advertising copy and/or audio/video advertising material electronically, and can in essence bid for and obtain advertising time slots during which (a) their advertisements containing a broadcast network's easy-to-use number may be broadcast, and (b) the present invention is used to route calls generated in response to the advertisements, based upon context, to appropriate transaction processing centers.

As shown in FIG. 7, advertiser 710 includes a processor 720 that performs various functions, including control of the dissemination and transmission of advertisements stored in a video storage facility 715, which may, for example, be a video cassette player or similar device. At the appropriate time, a signal from processor 720 causes a particular advertisement to be transmitted from advertiser 710 via video transport network 740 to either broadcast network 160 or affiliated station 120. Network 740 can be part of IXC network 150, and include both wired and/or wireless transmission facilities.

Processor 720 can also communicate with routing database 155 and processors 121, 161 and 133, via data network 153, for the purpose of obtaining a time slot for a particular advertisement, and for updating information stored in database 155 relating to that advertisement. The process performed in processor 720, in conjunction with processors 121, 161 and/or 133, is best illustrated by reference to FIG. 8, which depicts the format of a second type of record stored in routing database 155.

As shown in FIG. 8, each row in the record pertains to an individual time slot during which an advertisement may be broadcast. The various columns in this record contain information similar to that contained in portions of the record of FIG. 2. Specifically, column 820, contains the time period during which calls made in response to a particular advertisement will be routed in accordance with the present invention; this is analogous to the information in column 221 of FIG. 2. Column 821 contains the identity of the affiliated station that will broadcast an advertisement; this is analogous to the information in column 222 of FIG. 2. Column 824 contains originating number information; this is analogous to the information in column 220 of FIG. 2. Column 825 contains terminating number information; this is analogous to the information in column 223 of FIG. 2.

The information in column 822, can be of two types: if a time slot is "reserved" for an advertisement, the advertisement is identified here; on the other hand, if the time slot is "available" for an advertisement, the "price" for the use of the time slot may be listed here.

In operation, consider that the record of FIG. 8 is initially partially populated with information in certain columns, by the broadcast network 160. Specifically, for available time slots, information is entered in columns 820, 821, 822 and 824, since this information is initially determined by the broadcast network. Now, at any subsequent time, the record of FIG. 8, partially populated with information as indicated above, may be accessed by an advertiser 710. If the advertiser desires to reserve and use an available time slot, and is willing to pay the price indicated in column 822, then the price information in column 822 is replaced by a description of the advertisement, and the information in column 825 is populated by the advertiser. The record of FIG. 8 is now complete, and information in this record may be transferred to the appropriate columns in the corresponding record of the type shown in FIG. 2 for the broadcast network in question. This now allows calls made in response to the advertisement, when it is broadcast, to be routed in to the advertiser's transaction processing center, in the context sensitive manner as contemplated by the present invention. In addition, the advertiser can then transmit the advertising program material to be broadcast in the time slot just reserved, from video storage facility 715 to affiliated station 120.

It is to be understood that the foregoing detailed description of the processes performed by (a) an affiliated station 120, (b) a transaction processing center 130, (c) a caller at viewer/listener location 110, and (d) an advertiser 710, are illustrative only, and that various changes may be made by persons skilled in the art. For example, while the call completion process indicated a single "database dip" in which routing database 155 was consulted to obtain a terminating telephone number, it is to be understood that a "double database dip" is also envisioned, in which a first query is directed to an IDB NCP, which returns a routing number causing a subsequent dip into a 2DSD NCP. In this regard, it is also to be noted that routing database 155 may (a) cooperate with other databases in determining call routing and handling, (b) that some of these databases may be owned or controlled by customers and/or be located on customer premises, and (c) that distributed database architectures can be used, such that the information in the records illustrated in FIG. 2 can in reality be stored in more than one location at the same time.

That which is claimed is:

1. A method for completing transactions relating to advertisements of a plurality of advertisers, the advertisements including a response telephone number and broadcast by a broadcast network broadcasting in a plurality of different geographic areas, said method comprising:

routing a call placed to said response telephone number by a recipient of one of said advertisements; and to a switch in a telecommunications network, said one advertisement corresponding to one of said plurality of advertisers, said one advertisement broadcast in at least one of said plurality of different geographic areas;

determining an identity of said one advertiser by comparing information corresponding to a time interval during which said telephone call originated and the geographic area from which said telephone call originated with information previously stored in a database, said information including information relating each advertisement with one of the plurality of advertisers and at least one of a broadcast time for each one of the plurality of advertisements and a broadcast area for each one of the plurality of advertisements; and completing said call by further routine said call to a transaction processing center arranged to process transactions related to said one advertiser.

2. The method defined in claim 1 wherein said completing step includes using a specific terminating telephone number provided by said one advertiser.

3. A method for context-based routing of a telephone call, the method comprising:

storing in a database information associating a plurality of advertisements to be broadcast to recipients located in a plurality of different geographic areas at particular times with a plurality of destination telephone numbers;

receiving, in response to one of said plurality of advertisements broadcast at one of said particular times to recipients located in at least one of said plurality of different geographic areas, a telephone call to a response telephone number placed by a recipient of said advertisement, the response telephone number included in said advertisement;

determining at least one of a geographic area in which said received call originated and a time at which said received call was received;

retrieving, based upon at least one of said geographic area in which said received call originated and the time at which said received call was received, information stored in said database;

determining which of said plurality of advertisements was received by said recipient based on said retrieved information; and initiating routing of said call to the destination telephone number associated with said determined advertisement.

4. A method for completing telephone transactions initiated in response to advertisements broadcast by local stations that are part of a broadcast network, each of said plurality of local stations broadcasting in one of a plurality of geographic areas, said broadcast network having a response telephone number which is included in said advertisements, said method comprising:

receiving a telephone call placed to said response telephone number in response to one of said advertisements being broadcast by at least one of said local stations;

determining a location from which said telephone call originated;

determining which of said plurality of geographic areas includes said determined location;

determining which of said plurality of local stations broadcasts in said determined geographic area;

determining which of said advertisements was broadcast by said determined local station; and routing said telephone call to a transaction processing center arranged to process transactions related to said determined advertisement.

5. A method for context-based routing of a call made to a response telephone number appearing in a plurality of different broadcast advertisements by a recipient in response to the recipient experiencing a particular one of the plurality of different broadcast advertisements, said broadcast advertisement broadcast at a particular time by a particular station broadcasting in a particular geographic area, said method comprising:

receiving said call placed by said recipient to said response telephone number;

determining, based upon at least one of a location from which said received call originated and a time at which said received call was originated and at least one of broadcast times and broadcast areas of the plurality of different broadcast advertisements, information corresponding to the particular advertisement experienced by the recipient; and determining, based on the determined information, which advertisement was being broadcast by said station at said time; and determining, based on the determined advertisement, where calls responding to said advertisement should be routed.

6. A method for routing a telephone call initiated in response to a broadcast advertisement of an advertiser, said advertisement including a response telephone number to be called by recipients of said advertisement, said response telephone number included in advertisements of different advertisers, the method comprising:

providing information to a routing database correlating each advertisement with an advertiser;

adjusting the information stored in the routing database in response to said broadcast advertisement being broadcast so that calls placed to said response telephone number in response to said broadcast advertisement being broadcast are routed to a transaction processing center of said advertiser arranged to process said transactions; and determining to which advertiser the telephone call is to be routed based on said information.

7. A method for context-based processing of a telephone call to a response telephone number initiated in response to one of a number of different broadcast advertisements, each advertisement including the response telephone number, the response telephone number included in advertisements of different advertisers, the method comprising:

determining, based on at least one of broadcast times and broadcast areas of the number of different broadcast advertisements, information corresponding to the advertisement in response to which said telephone call was initiated; and routing, based on said determined information, said telephone call to a terminating telephone number associated with said advertisement.

8. The method defined in claim 7 wherein the determining step comprises determining said information as a function of a time at which said telephone call was made and times at which said number of different broadcast advertisements were broadcast.

9. The method defined in claim 7 wherein the determining step includes determining said information as a function of a location where said telephone call originated and geographic areas where said number of different broadcast advertisements were broadcast.

10. The method defined in claim 7 wherein said determining step includes the step of querying a database containing information including at least one of times at which, and geographic areas where, said number of different broadcast advertisements were broadcast, said information provided by at least one of said broadcast network and local stations of said broadcast network.

11. The method defined in claim 10 wherein said at least one of said broadcast time and broadcast geographic area information in said database is updated substantially concurrently with said advertisement being broadcast.

12. The method defined in claim 11 wherein said updating is performed by at least one of said broadcast network, said broadcast network's local stations, said advertiser and said transaction processor.

13. The method defined in claim 7 further including:
querying a caller who initiated the call; and receiving at least one response to resolve uncertainties as to which advertisement the call is responding.

14. The method of claim 13 wherein said querying step is performed by a voice response system.

15. The method of claim 14 wherein the information in said voice response system is updated at the same time that corresponding information in a database is updated.

16. The method defined in claim 7 wherein abnormalities in call volume of calls routed to said transaction processor are mitigated with load smoothing.

17. The method of claim 16 wherein said load smoothing includes arranging call back capabilities and interactive voice-sessions.

18. The method of claim 17 wherein said call back capabilities are implemented in a network-based processor arranged to match said advertisement.

19. The method defined in claim 7 further including:
collecting information for incoming telephone calls placed to said response telephone number, the information identifying at least one of call characteristics and call disposition for a plurality of terminating telephone numbers to which said incoming telephone calls are routed.

20. The method of claim 19 wherein said call characteristics include times at which said incoming telephone calls originated and locations from which said incoming telephone calls originated.

21. The method defined in claim 19 wherein information collected in said collecting step is transmitted to at least one of said broadcast network, local stations of said broadcast network, and an advertiser of said advertisement.

22. The method defined in claim 7 further including:
maintaining a schedule of advertising to be broadcast by said broadcast network, said schedule including a plurality of time slots and an indication of availability of said time slots for use by an advertiser; and
updating said schedule and said availability indication in response to messages received from said advertiser.

23. A system for completing transactions relating to broadcast advertisements broadcast by a broadcast network having a plurality of local stations each broadcasting in different geographic areas, wherein a response telephone number is included in an advertisement broadcast by said local stations on behalf of a particular advertiser, said system comprising:
a switch in a telecommunications network for receiving a telephone call placed to said response telephone number by a recipient located in one of said geographic areas in response to said advertisement; and
means for routing said telephone call from said switch to a transaction processing center arranged to process transactions related to said particular advertiser, said routing based upon information relating to at least one of a time interval during which said telephone call is originated, and the geographic area from which said telephone call originated.

24. The system defined in claim 23 wherein said routing means includes a database containing terminating telephone number provided by advertisers, each advertiser corresponding to at least one of said broadcast advertisements.

25. A system for context-based routing of telephone calls comprising:
a database for storing information associating a plurality of advertisements to be broadcast to recipients located in a plurality of different geographic areas and to be broadcast at particular times with a plurality of destination telephone numbers;

means for receiving, in response to one of said plurality of advertisements being broadcast at one of said particular times to recipients located in at least one of said plurality of different geographic areas, a telephone call to a response telephone number placed by a recipient of said advertisement, the response telephone number included in said advertisement;
means for determining at least one of a geographic area from which said received call originated and the time at which said received call was received;
means for retrieving, based upon said at least one of said geographic area in which said received call originated and the time at which said received call was received, information stored in said database and for determining which of said plurality of advertisements was received by said recipients based on said retrieved information; and
means for initiating routing of said call to the destination telephone number associated with said determined advertisement.

26. Apparatus for completing telephone transactions initiated in response to advertisements broadcast by local stations that are part of a broadcast network, each of said plurality of local stations broadcasting in one of a plurality of geographic areas, said broadcast network having a response telephone number included in said advertisements, said apparatus comprising:
means for receiving a telephone call placed to said response telephone number in response to one of said advertisements being broadcast by at least one of said local stations, for determining a location from which said telephone call originated, which of said plurality of geographic areas includes said determined location, and which of said plurality of local stations broadcasts in said determined geographic area;
means for associating a particular advertisement, based on the determined location, the determined geographic area and the determined local station, with the telephone call; and
means for routing said telephone call to a transaction processing center arranged to process transactions related to said particular advertisement.

27. A system for context-based routing of a call made to a response telephone number by a recipient in response to the recipient experiencing one of at least one broadcast advertisement, said broadcast advertisement broadcast at a particular time by one of at least one station, said station broadcasting in a particular geographic area, said system comprising:
a routing database;
means for receiving said call placed by said recipient to said response telephone number;
means for determining, based upon at least one of a location from which said received call originated, and a time at which said received call originated and at least one of broadcast times and broadcast areas of the at least one broadcast advertisement, information corresponding to the advertisement experienced by the recipient;
means for determining, based on the determined information, where calls responding to said advertisement should be routed; and
means for routing the call placed by said recipient to a processing center associated with the advertisement.

28. A system for routing a telephone call initiated in response to a broadcast advertisement, the advertisement including a response telephone number to be called by recipients of the advertisement, said response telephone number included in advertisements of different advertisers, the system comprising:

means for providing information to a routing database correlating a plurality of advertisements with corresponding transaction processing centers;

means for adjusting the information stored in said routing database in response to said broadcast advertisement being broadcast, so that calls placed to said response telephone number are routed to a transaction processing center corresponding to said broadcast advertisement and arranged to process said transactions; and means for determining to which transaction processing center the telephone call is to be routed based on said information and information about the telephone call.

29. Apparatus for context-based processing of a telephone call to a response telephone number initiated in response to one of a number of different broadcast advertisements, the telephone call to be by routed to a transaction processor associated with the advertisement, each advertisement including the response telephone number, the response telephone number included in advertisements of different advertisers, the apparatus comprising:

means for determining, based on at least one of broadcast times and broadcast areas of the number of broadcast advertisements, the advertisement in response to which said telephone call was initiated;

means for associating said telephone call placed to said response telephone number with a terminating telephone number associated with said advertisement; and means for routing said telephone calls to said transaction processor using said terminating telephone number.

30. The apparatus defined in claim 29 wherein the determining means comprises means for determining said advertisement as a function of a time at which said telephone call was made and times at which said number of different broadcast advertisements were broadcast.

31. The apparatus defined in claim 29 wherein the determining means comprises means for determining said advertisement as a function of a location from where said telephone call originated and geographic areas where said number of different broadcast advertisements were broadcast.

32. The apparatus defined in claim 29 further including a database containing broadcast time and broadcast area information for said different broadcast advertisements, said information provided by at least one of a broadcast network on which the advertisement was broadcast and local stations of said broadcast network.

33. The apparatus defined in claim 32 wherein said broadcast time and broadcast area information in said call routing database is updated substantially concurrently with each said advertisement being broadcast.

34. The apparatus defined in claim 33 wherein said updating is performed by at least one of said broadcast network, said local stations, an advertiser of said advertisement and said transaction processor.

35. The apparatus defined in claim 29 further including means for transmitting at least one query to a caller who initiated the call and for receiving at least one response from the caller in response to the at least one query to resolve uncertainties as to which advertisement the caller is responding.

36. The apparatus of claim 35 wherein said querying means includes a voice response system.

37. The apparatus of claim 36 including means for updating information in said voice response system at the same time that corresponding information in a database is updated.

38. The apparatus defined in claim 29 including means for mitigating abnormalities in call volume calls routed to said transaction processor.

39. The apparatus of claim 38 wherein said mitigating means includes means for providing call back capabilities and interactive voice-sessions.

40. The apparatus of claim 39 wherein said call back capabilities are implemented in a network-based processor arranged to match said advertisement.

41. The apparatus defined in claim 29 further including:

means for collecting information for incoming telephone calls placed to said response telephone number, the information identifying at least one of call characteristics and call disposition for a plurality of terminating telephone numbers to which said incoming telephone calls are routed.

42. The apparatus of claim 41 wherein said call characteristics include times at which said incoming telephone calls originated and locations from which said incoming telephone calls originated.

43. The apparatus defined in claim 41 wherein information collected in said collecting means is transmitted to at least one of said broadcast network, local stations of said broadcast network, and an advertiser of said advertisement.

44. The apparatus defined in claim 29 further including:

means for maintaining a schedule of advertising to be broadcast by said broadcast network, said schedule including a plurality of time slots and an indication of availability of said time slots for use by an advertiser; and means for updating said schedule and said availability indication in response to messages received from said advertiser.

45. A method for use in routing a telephone call placed to a response telephone number, the response telephone number presented in a plurality of different advertisements, where calls to the response telephone number in response to the plurality of different advertisements are to be routed to a plurality of different destination telephone numbers, the method comprising:

querying a database in response to the telephone call to determine to which of the plurality of different destination telephone numbers the telephone call is to be routed, said querying based on at least one of a time associated with the telephone call and a geographic area associated with the telephone call, said database associating with each one of the plurality of different advertisements:

a corresponding one of the plurality of destination telephone numbers to which telephone calls to the response telephone number in response to that advertisement should be routed, and at least one of:

a time interval during which telephone calls to the response telephone number in response to that advertisement are expected to be placed, and information representing at least one geographic area from which telephone calls to the response telephone number in response to that advertisement are expected to originate; and initiating routing of the telephone call based on the determined destination telephone number.

46. The method of claim 45, wherein the plurality of different advertisements are broadcast at a plurality of different times over a broadcast network.

47. The method of claim 45, wherein the plurality of different advertisements are broadcast by a plurality of different local stations of a broadcast network, each local station serving a different geographic location.

48. The method of claim 45, further comprising distributing the plurality of different advertisements through a distribution network to a plurality of recipients, the telephone call initiated by one of the recipients in response to receiving one of the plurality of advertisements.

49. The method of claim 48, wherein the distribution network is at least one of a television broadcast network, a cable television broadcast network, a direct satellite television broadcast network, a radio broadcast network, an electronic distribution network, and a printed matter distribution network.

* * * * *